(12) United States Patent
Beans

(10) Patent No.: US 12,542,945 B2
(45) Date of Patent: Feb. 3, 2026

(54) SYSTEM AND METHOD FOR PROVIDING USER-SPECIFIED CONTENT TO PARTICIPATING DISPLAYS

(71) Applicant: Eric Beans, Orlando, FL (US)

(72) Inventor: Eric Beans, Orlando, FL (US)

( * ) Notice: Subject to any disclaimer, the term of this patent is extended or adjusted under 35 U.S.C. 154(b) by 0 days.

(21) Appl. No.: 18/125,523

(22) Filed: Mar. 23, 2023

(65) Prior Publication Data
US 2023/0319335 A1 Oct. 5, 2023

Related U.S. Application Data

(60) Provisional application No. 63/324,919, filed on Mar. 29, 2022.

(51) Int. Cl.
| | |
|---|---|
| *H04N 21/2743* | (2011.01) |
| *H04N 21/2343* | (2011.01) |
| *H04N 21/2543* | (2011.01) |
| *H04N 21/414* | (2011.01) |
| *H04N 21/454* | (2011.01) |

(52) U.S. Cl.
CPC ..... *H04N 21/2743* (2013.01); *H04N 21/2343* (2013.01); *H04N 21/2543* (2013.01); *H04N 21/41415* (2013.01); *H04N 21/454* (2013.01)

(58) Field of Classification Search
CPC ........... H04N 21/2743; H04N 21/2343; H04N 21/2543; H04N 21/41415; H04N 21/454; H04N 21/4367; G06Q 30/0251
See application file for complete search history.

(56) References Cited

U.S. PATENT DOCUMENTS

| | | | |
|---|---|---|---|
| 2006/0167745 A1* | 7/2006 | Wiethorn | G06Q 30/0271 715/752 |
| 2012/0191549 A1* | 7/2012 | Winarski | G06Q 30/0273 705/14.69 |
| 2015/0046269 A1* | 2/2015 | Liu | G06Q 30/0241 345/204 |
| 2016/0098756 A1* | 4/2016 | Ayre | G01S 19/13 705/14.63 |

\* cited by examiner

*Primary Examiner* — Chenea Davis
(74) *Attorney, Agent, or Firm* — Jason T. Daniel, Esq; Daniel Law Offices, P.A.

(57) ABSTRACT

A system and method for providing user-specified content on participating displays includes a platform provider system for facilitating communication between a content provider interface device, a content delivery device, and a display owner interface device. A content delivery device having a location identification module, a content formatter and an output jack is connected to a display device. The platform provider receives content from the content provider interface device. The content is screened to comply with content limitations, and approved content is provided to the content delivery device. The display device can include an outdoor billboard, a video monitor or a sound system, which may be located at a fixed location or on a moving platform. Content from the content interface device is played at a time chosen by the content provider or streamed in real or near real time on the display.

11 Claims, 6 Drawing Sheets

| DISPLAY NAME | DISPLAY TYPE | CONTENT TYPE | RESTRICTIONS | LOCATION | COMMUNICATION |
|---|---|---|---|---|---|
| DP 1702 | Billboard | audiovisual | 7, 13, 26 | Times Square, NYC | coax, RF |
| DP 1704 | monitor | video | 2, 28 | 101 Elm St. back of bar | wifi |
| DP 1705 | speaker | audio | 1, 2, 18 | 205 Boss St, entire venue | wifi |
| MDP 207 | monitor | audiovisual | 1, 2, 7, 17, 26, 32 | Amtrak Train 1701 | dual |

405 — DISPLAY NAME; 410 — DISPLAY TYPE; 415 — CONTENT TYPE; 420 — RESTRICTIONS; 425 — LOCATION; 430 — COMMUNICATION

FIG. 4

SYSTEM AND METHOD FOR PROVIDING USER-SPECIFIED CONTENT TO PARTICIPATING DISPLAYS

CROSS-REFERENCE TO RELATED APPLICATIONS

This application claims the benefit of U.S. Application Ser. No. 63/324,919 filed on Mar. 29, 2022, the contents of which are incorporated herein by reference.

TECHNICAL FIELD

The present invention relates generally to systems and methods for allowing a user to upload and display content on any number of different display screens such as billboards, taxis and television monitors within a bar or restaurant environment, for example.

BACKGROUND

The statements in this section merely provide background information related to the present disclosure and may not constitute prior art.

Digital marketing is among the most prevalent and popular means for providing pertinent advertisements to target audiences. In many instances, this process involves the use of display screens such as billboards, live screens on taxis and public transportation vehicles, dedicated televisions within bars, restaurants, clubs, gyms, and shopping establishments, along with jumbo screens at stadiums, racetracks, and other such locations.

The current state in digital advertising on such displays typically involves advertisers arranging for their content/ads to be displayed on one or more displays at set intervals over time. Because the ads are generated in advance, and played multiple times, the goal of the advertiser is to attempt to reach the broadest possible audience. As such, the advertiser is not typically able to tailor their content for a specific crowd or event that is happening live. For this reason, conversion rates from this type of advertising are often hit or miss in terms of connecting with the target audience.

In addition to commercial advertising companies, there are often times where individual users could benefit from allowing content to be displayed on a particular display device at a particular time. For example, when visiting times square, a user could have one or more of the billboards play a proposal video he or she created. Likewise, a music artist may want to have his or her video played on a bus or train that is near a recording studio. Under the current system, there does not exist an easy or convenient way for someone to push content to a display screen.

Accordingly, it would be beneficial to provide a system and method for allowing a user to upload and display content on one or more displays at any time and location so as to overcome the drawbacks noted above.

SUMMARY OF THE INVENTION

The present invention is directed to a system and method for providing user-specified content on participating displays. One embodiment of the present invention can include a platform provider system for generating and supporting a website and mobile application for facilitating communication between a content provider interface device, a content delivery device, and a display owner interface device.

A content delivery device having a location identification module, a content formatter and an output jack can be communicatively linked to a display device provided by the display device owner. The platform provider can receive content from the content provider interface device. The content can be screened to comply with content limitations imposed by the display owner, and approved content can be provided to the content delivery device. The content delivery device can format the received content for playback on the display device.

The display device can include an outdoor billboard, a video monitor, or a sound system, which may be located at a fixed location or on a moving platform such as a plane, train, or automobile. The content interface device can be a user cellular telephone, and content from the content interface device can be played at a time chosen by the content provider or streamed in real or near real time on the display.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

FIG. 4 shows an exemplary flow chart illustrating onboarding information for each of the participating displays, according to one embodiment.

DETAILED DESCRIPTION OF THE INVENTION

Figure 1:
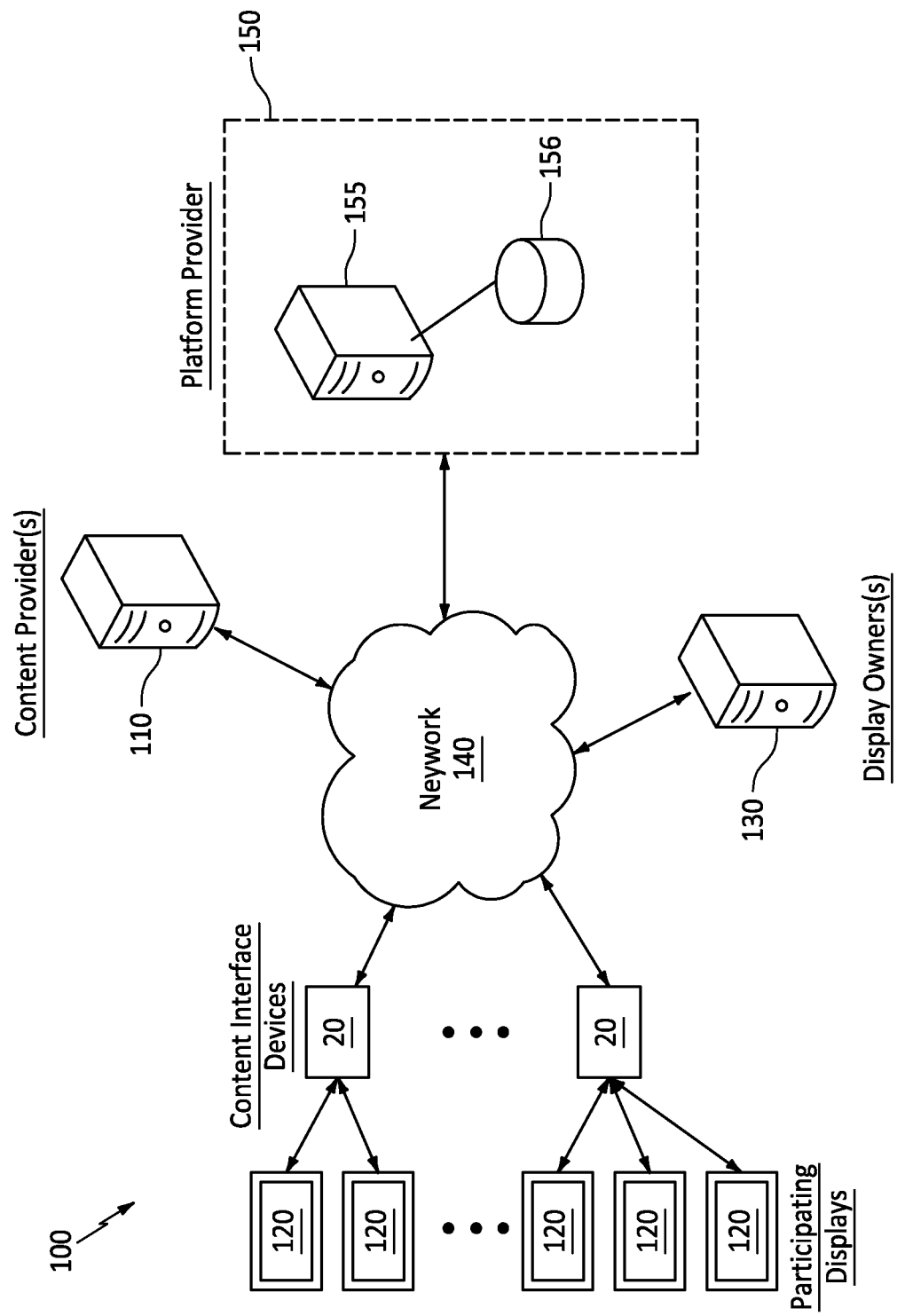
FIG. 1 shows an exemplary network environment of a system for providing user-specified content on participating displays according to some embodiments of the technology.

One embodiment of a system and method for providing user-specified content to participating displays is provided below. Unlike traditional methods for providing content, the present system allows any user to push content to a selected display so as to allow the content to be played at a set time and place for their personal benefit. In some embodiments, content can stream in real or near-real time from a user's device to a participating display, so as to allow users to utilize displays on a spur of the moment basis. Such a system advantageously allows customers to advertise their business, push messages, hear their preferred music and other factors in real time.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Identical reference numerals are used for like elements of the invention or elements of like function. For the sake of clarity, only those reference numerals are shown in the individual figures which are necessary for the description of the respective figure.

Definitions

As described herein, the term "user specified content", "content," and derivatives thereof can include any type of audio or visual information and data such as visual images (e.g., pictures, words, and videos that are still, motion, live, or animated), and/or sounds (e.g., spoken words, music, sound effects), etc. In some instances, the content can be pre-recorded and uploaded to the platform provider or can be streamed live from a content provider to be displayed in real time or at a future day/time.

As described throughout this document, the term "content provider" and "user" can be used to describe any individual, group or entity who is providing content to the system to be displayed on a display device. In this regard, the content provider may be the individual who created the content or can be a third-party individual who is providing content generated by others to the system for display (e.g., an advertiser or influencer).

As described herein, the terms "display", "display device" and "participating display" can be used interchangeably to describe any device capable of playing content to a consumer. Several nonlimiting examples include but are not limited to sound/speaker systems and video display screens such as digital billboards, televisions, monitors, holographic image generators, tablets, and other such devices. Additionally, the inventive concepts are contemplated for use within a computer environment such as the Metaverse, for example, therefore a "display" can include a virtual representation of the above noted devices and/or any other type of digital object which can be transformed or play the content within the computer environment.

Although described throughout this document as showing content on a display it is to be understood that displaying or showing content on a display also comprises playing sounds on a speaker, as the "content" is not limited to visual elements, and the "display" can include or comprise a speaker or sound system.

As described herein, a "display owner" can include any include any individual, group or entity who owns or otherwise controls the operation of one or more display devices in the real world or in a computer environment (e.g., the metaverse), and who wishes to make the display(s) available to show content from the system.

The term "platform provider" describes the individual, group or legal entity that is providing the system hardware, overseeing and/or performing various portions of the below described methodology to permit a content provider to display content on a display device of a display owner.

In various embodiments, the system and method for providing user-specified content to participating displays can include one or more websites having any number of different URL addresses. Additionally, it is contemplated that several different methods and/or method steps can be performed simultaneously via different websites that are directed towards different individual markets and/or geographic locales. Such methods can be performed under the direct supervision of the original platform provider, or via secondary system administrator through a franchise or other form of legal agreement.

In various embodiments, one or more aspects of the system can also include, utilize and/or be presented in the form of one or more mobile applications (i.e., Apps) that can be downloaded and installed as an application for use on a smartphone or other such portable electronic device. Of course, the inventive concepts disclosed herein are not to be construed as limiting to a mobile application, as virtually any type of instruction sets, in any form of programming language that can be executed on any type of processor enabled device are also contemplated.

FIG. 1 is a schematic illustration of an exemplary operating environment 100 for implementing a system for providing user-specified content to participating displays, on which the below described methodology may be implemented.

As shown, one embodiment of the system 100 can include at least one content provider interface device 110 that is operated by a content provider, at least one participating display 120, at least one content delivery device 20, and at least one display owner interface device 130 that are in communication with the platform provider 150 over a network 140.

Each of the interface devices 110 and 130 can be any type of computing device that is operated by a human user. A computing device refers to any device with a processor and memory that can execute instructions. Computing devices include, but are not limited to, personal computers, smartphones, tablet computers, laptop computers and other such devices. In either instance, each of the computing devices can include one or more client applications, such as a conventional web browser which can allow the device user to communicate with other interface devices and/or the platform provider 150.

The platform provider 150, according to one embodiment, can include one or more individual computing devices 155 that can be connected to one or more databases 156 on which various portions of the method can be performed. The platform provider 150 can function to provide a central hub for controlling the communication between the content delivery devices 20, and the user interface devices 110 and 130 through any number of different mediums such as the above noted website, for example. In this regard, one or more of the individual computing devices 155 can comprise a web server, an email server, an application database server and so forth, or the system can employ a single server device which functions to handle each of these processes.

Portions of the described methodology can be implemented as a computer program product, i.e., a computer program tangibly embodied in a non-transient machine-readable storage device, for execution by, or to control the operation of, a data processing apparatus. The computer program can be written in any form of computer or programming language, including source code, compiled code, interpreted code, scripting code (e.g., JavaScript) and/or machine code, and the computer program can be deployed in any form, including as a stand-alone program or as a subroutine, element, or other unit suitable for use in a computing environment. As such, the system can function to generate a plurality of portals on which content providers can upload content to be played on a display device.

The database 156 can function to receive and store information such as program steps, uploaded content, terms and conditions, display screen rates and more. As described herein, the database 156 can include any type of computer-readable storage mediums, including all forms of volatile and non-volatile memory such as, for example, semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks.

In one embodiment, the database or a portion thereof can include, comprise, or consist of blockchain technology for performing digital recordkeeping and can use digital passports tied to various Holograms, non-fungible tokens, NFT's for real world/digital world.

The network 140 can be any type of network, including a local area network ("LAN"), such as an intranet, a wide area network ("WAN"), such as the internet, a completely decentralized network through any kind of blockchain infrastructure and/or any combination thereof. Further, the communication network 140 can be a public network, a private network, or a combination thereof. The communication network 140 can also be implemented using any number of communication links associated with one or more service providers, including one or more wired communication links, one or more wireless communication links, or any combination thereof. Additionally, communication network 140 can be configured to support the transmission of data formatted using any number of protocols.

To facilitate communication via the network, each of the interface devices can also include a communication interface configured to receive a communication, such as a request, data, etc., from another computing device in network communication with the computing device and pass the communication along to an appropriate module running on the computing device. The communication interface can also be configured to act as blockchain enabled NODES and send a communication to another computing device or NODE within network communication with the computing device. The communication nodes will have a unique public and/or private key for identification purposes within the communication network.

As will be described below, the content delivery device 20 can function as an interface to allow the system components to talk to and provide content to any type of display 120. In various embodiments, a single content delivery device can be used to communicate with one or multiple different displays and can be provided by the platform provider to a display owner upon registering with the system.

Figure 2:
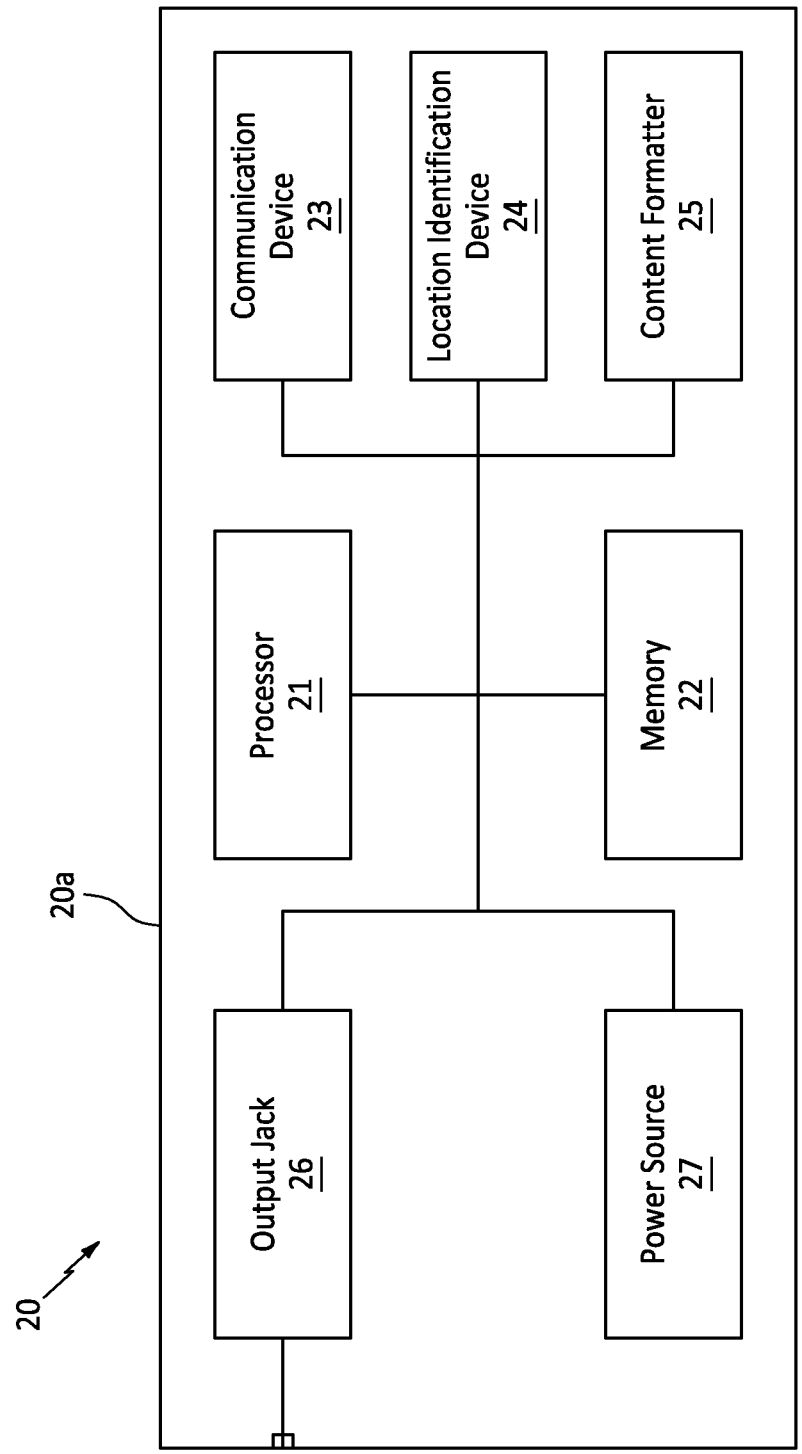
FIG. 2 shows an exemplary block diagram of the content delivery device of the system, in accordance with one embodiment.

FIG. 2 is an exemplary block diagram of a content delivery device 20 for use herein. As shown, the device 20 can include, essentially, a main body 20*a* for housing a processor 21, that is conventionally connected to an internal memory 22, a communication device 23, a location identification device 24, a content formatting component 25, a content output jack 26, and a power source 27.

Although illustrated as separate elements, those of skill in the art will recognize that one or more system components may comprise or include one or more printed circuit boards (PCB) containing any number of integrated circuit or circuits for completing the activities described herein. Of course, any number of other analog and/or digital components capable of performing the below described functionality can be provided in place of, or in conjunction with the below described controller elements.

The main body 20*a* can include any number of different shapes and sizes and can be constructed from any number of different materials suitable for encompassing each of the controller elements. In one preferred embodiment, the main body can be constructed from lightweight injection molded plastic having a plurality of internal connectors (not shown) for securely housing each of the device elements. Of course, any number of other known construction materials such as PVC and composites, for example, are also contemplated.

The processing unit 21 can be a conventional central processing unit (CPU) or any other type of device, or multiple devices, capable of manipulating or processing information such as program code stored in the memory 22 and for causing the circuitry to complete the activities and functionality described herein.

Memory 22 can act to store operating instructions in the form of program code for processor 21 to execute. Although illustrated in FIG. 2 as a single component, memory 22 can include one or more physical memory devices such as, for example, local memory and/or one or more bulk storage devices. As used herein, local memory can refer to random access memory or other non-persistent memory device(s) generally used during actual execution of program code, whereas a bulk storage device can be implemented as a persistent data storage device such as a hard drive, for example, containing programs that permit the processor to perform the functionality described below.

In addition to the above, memory 22 can function to receive and store content from the platform provider which can be formatted by the below described formatting component and subsequently outputted to a display device. In this regard, memory 22 can include any number of bulk storage devices such as various hard disk drives and other such components.

The communication device 23 can include any number of components capable of sending and/or receiving electronic signals with an externally located device, either directly or over a network. In various embodiments, the communication device 23 can include or comprise a wireless transceiver so as to communicate wirelessly directly or over a network such as a cellular data network, for example. Alternatively, or additionally, the communication device 23 can include or comprise a wired transceiver capable of communicating with an externally located device via a hardwire connection.

In certain instances, the communication device may comprise both a wired and wireless transceiver for independently communicating with a display device 120 and the platform provider 150. Although described with regard to particular components, this is for illustrative purposes only, as other known transmission and reception mechanisms/protocols can also be utilized herein, several nonlimiting examples including transmitters and receivers for communicating via radio frequencies, and/or a Bluetooth transceiver for communicating wirelessly with an external device such as a smartphone, computer and/or tablet device running an App, for example.

The location identification device 24 can function to provide real time location information (e.g., address, GPS coordinates, etc.) of the content delivery device 20 at all times. In one embodiment, the location module can include a cellular transceiver that receives cellular triangulation or location identification services from a cellular provider in order to allow the device to integrate with Google Maps or other such mapping software. The location information of the device 20 can be continuously sent to the platform provider and can be used for geo-location services thus allowing users to push content onto a display connected to a device 20 in a moving vehicle based on the location of the vehicle at any given time.

The content formatting component 25 can include any number of different programs which can be stored within the device memory 22 capable of formatting the received content to suit the display parameters of a specific display 120 to which the content delivery device is connected. To this end, the formatting component can function to adjust certain visual aspects of the content such as the aspect ratios, screen size, text size, and boundary boxes, along with adjusting the volume and other such features to ensure the content provided by the platform provider is able to be viewed and/or heard by the display 120 in optimum conditions for that particular display device.

The output jack 26 functions to output the formatted content to a display device. In one embodiment, the output jack can include, comprise, or consist of any type of physical communications port capable of receiving a communication cable that is connected to a display. Several nonlimiting examples include various USB ports, HDMI ports, Ethernet ports and/or coax cable ports, for example. Additionally, the output jack can include functionality for outputting the formatted content wirelessly to the display and can therefore include, comprise, or consist of any type of wireless transceiver or transmitter, for example.

The power source 27 can include any number of different components capable of providing the necessary power requirements to each element of the device 20. For fixed location devices, such as those that will be secured to a fixed billboard display device, the power source can preferably include a common A/C electrical power transformer and cord capable of allowing the system to be powered from an electrical outlet. However, for portable devices such as those to be used with displays located on moving vehicles, the power source can include a plurality of batteries that may be connected to a DC power cable for allowing the vehicle batteries to provide power to the device. Of course, other suitable power sources are contemplated.

Figure 3:
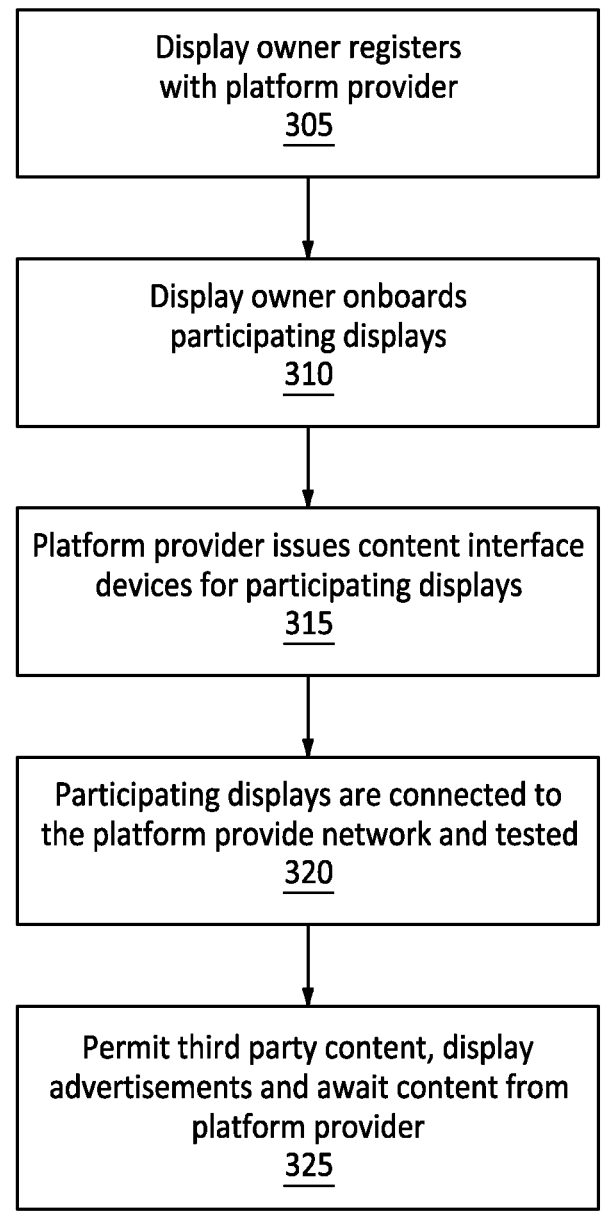
FIG. 3 shows an exemplary flow diagram illustrating a method for connecting and providing user-specified content to participating displays, according to one embodiment.

FIG. 3 illustrates one embodiment of method 300 for connecting and providing user-specified content to participating displays, utilizing the network system 100.

The method can begin at step 305, wherein a display owner undergoes a registration and contractual agreement process with the platform provider. This process can include compensation issues such as the cost of participating in the platform provider system, rates for displaying content participating displays, and other such factors. In this regard, it is noted the compensation may be static (e.g., set cost) or dynamic based on any number of different criteria.

Next, the method can proceed to step 310 where display owner can register/onboard each of their display devices they wish to use with the system. The onboarding process can be facilitated through the use of the above noted interface devices that can communicate via a mobile application or through the system website, for example. In either instance, the onboarding process can include providing any number of different presentation screens to the display owner sufficient to allow the display owner to provide information about each participating display.

FIG. 4 illustrates one example of the type of information retrieved by the registration process that can include:

Display Name 405—this can identify the display for communication with the system.

Display Type 410—this can explain the type of display device available to play content. Several nonlimiting examples include a digital billboard, fixed monitors, fixed televisions, mobile monitor, mobile television, radio broadcast systems, or speaker systems, for example;

Content Type 415—this can explain the type of content the specific display is capable of playing. Several examples include still images only, video only, audio only, audio and video, for example.

Restrictions 420—this can explain any restrictions associated with the playing of content. Several nonlimiting examples include: no offensive words, no religious advertisements, no adult-oriented advertisements, no sound after 8 pm, for example. In one embodiment, set restrictions can be assigned numerical codes for ease of form completion.

Location 425—this can explain the location of the display. The location can include a specific address for displays such as billboards, along with a more precise description of the location of the display when located within a venue.

Communication 430—this can provide information on how the display can receive content. Several nonlimiting examples include fixed cable connectors (e.g., coax, USB, HDMI, etc.) and/or wireless connectors (RF receiver, Wi-Fi receiver, Bluetooth receiver, etc.). This section can also include approved media formats for each display such as MP3, MP4, MOV, MKVV, WMV, AVI, MPEG, AAC AND WAV, among others, for example.

Although described above with regard to specific information, this is for illustrative purposes only. To this end, the onboarding process may include any number of different presentation screens for allowing the display owner to upload any other type of information about their displays.

Next, the method can proceed to step 315, where the platform provider can issue a content delivery device 20 to be connected to each of the participating displays. In some embodiments, each display device will have a single dedicated interface device 20, whereas other embodiments are contemplated wherein a single interface device 20 can be provided at a set location having multiple displays, and the single device can control each of the displays.

Next, the method can proceed to step 320 where each of the content delivery devices can be connected to the displays and can be communicatively linked to the platform provider system 155 over the network. When connected, each display can be tested to ensure it is capable of receiving and playing content. In this regard, the content formatter of the content delivery device can ensure any received content is changed/formatted to be optimally displayed on the designated display device (e.g., utilizing the entire screen, clear visual and audible output, etc.).

In instances where the display is not at a fixed location, such as an advertising monitor within a plane, train or motor vehicle, the location identification device 24 will provide the real time location of the display to the platform provider.

Figure 5:
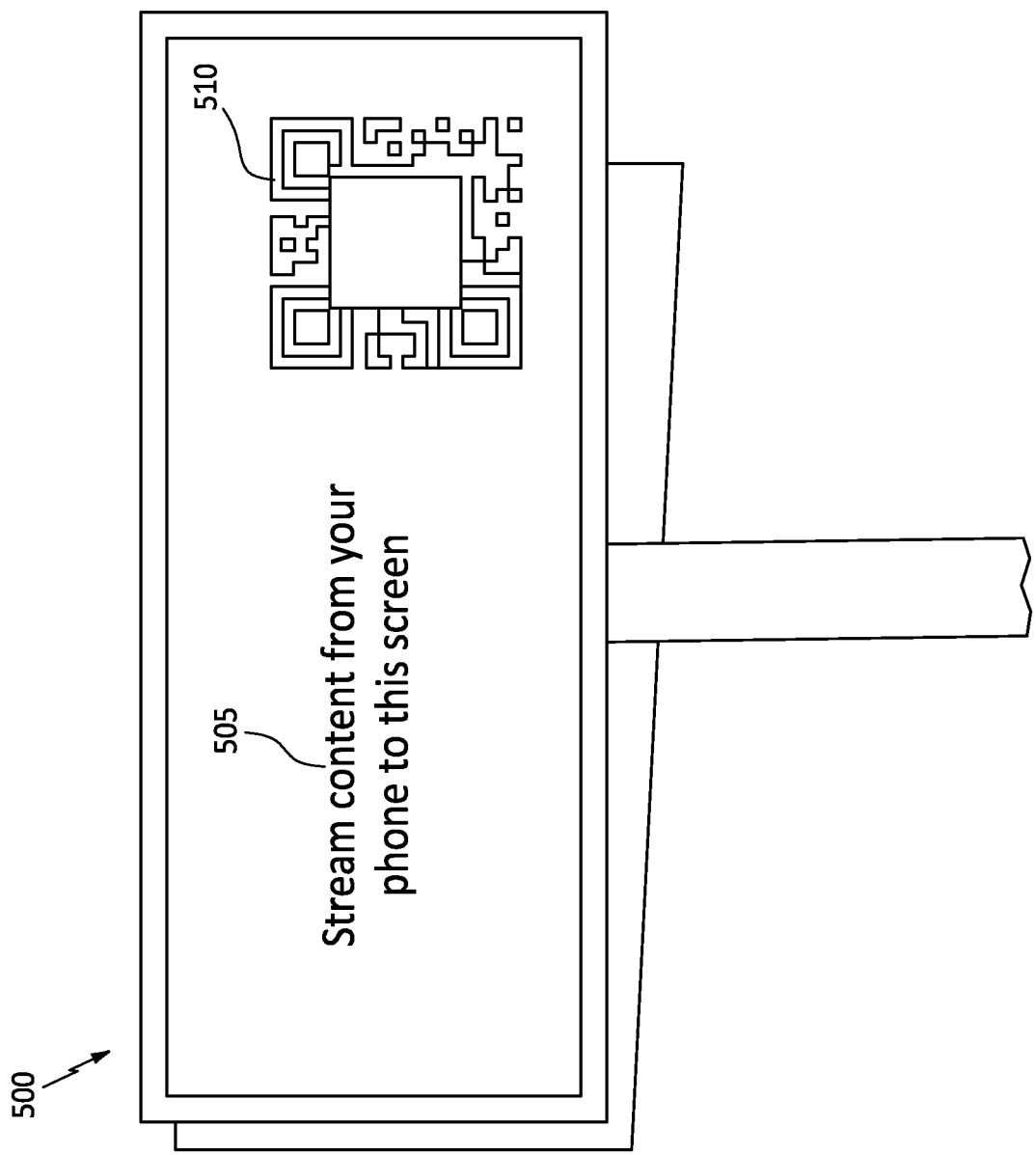
FIG. 5 is a front view of a participating display, in accordance with one embodiment.

Finally, the method can proceed to step 325 where the content delivery device can allow existing content or content from other sources to be played on the connected display unless and until content is received from the platform provider. During this time, the content delivery device can periodically list advertisements 505 and/or registration links 510 to use a display device 500 as shown at FIG. 5.

Figure 6:
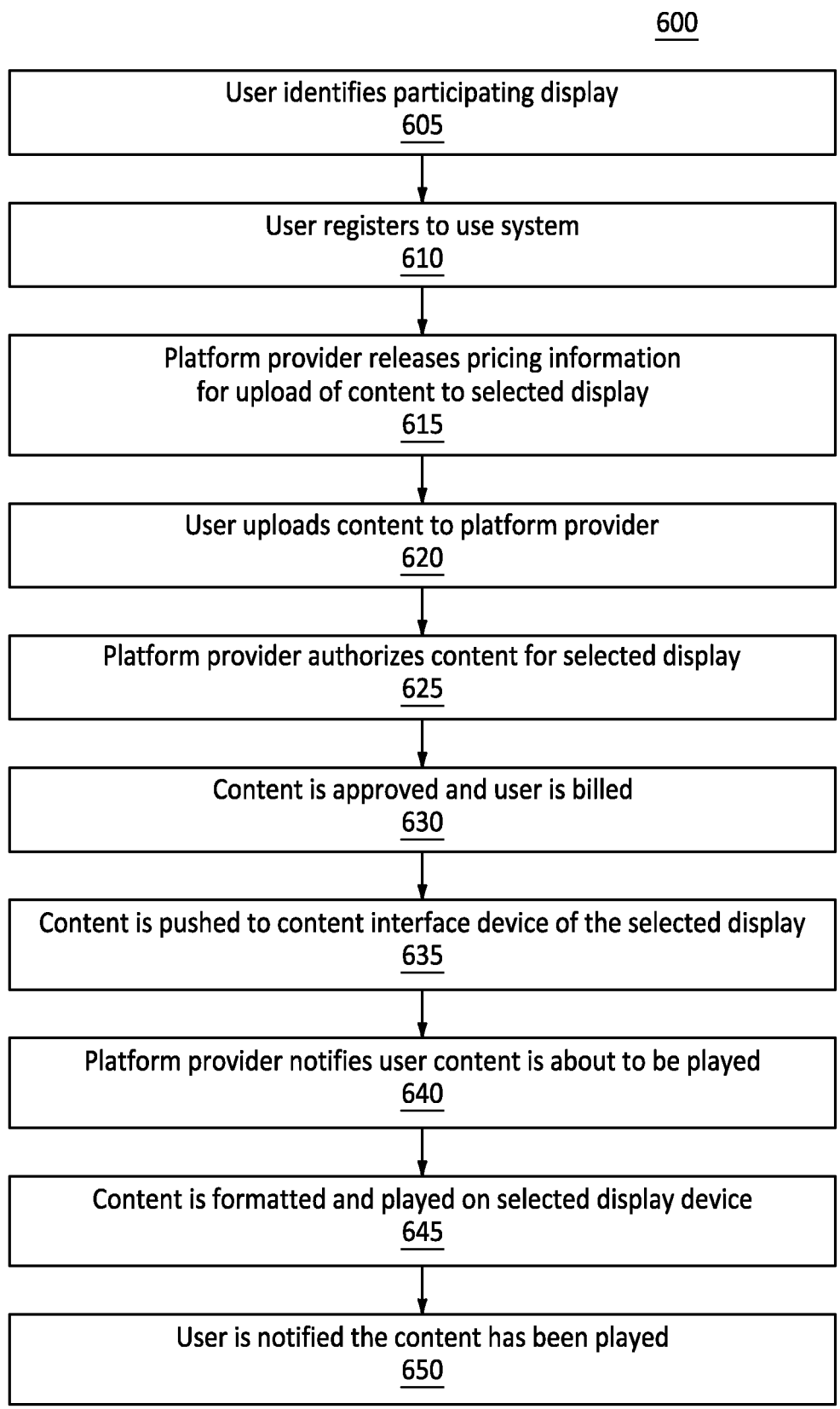
FIG. 6 shows an exemplary flow diagram illustrating a method for providing user-specified content to a participating display, according to one embodiment.

FIG. 6 illustrates one embodiment of a method 600 for a user to provide user-specified content to a participating display, utilizing the network system 100. Although described below with respect to particular steps and screens, this is for illustrative purposes only, as the methodology described herein can be performed in a different order than shown, and the presentation screens can include any number of additional information and features.

The method can begin at step 605 wherein a content provider identifies a participating display onto which they would like to push their content. In one embodiment, the user can identify participating displays through a listing on the platform provider website and/or can scan a code such as a QR code shown on the display itself.

In instances where the display is not at a fixed location, such as an advertising monitor within a plane, train or motor vehicle, the platform provider can include the predicted location of the connected display and the corresponding time. For example, if the device is located on a train, the provider can specify the time the train is expected to pass a set location such as a town, city, or street, for example. This time estimate can also be updated with real time information so as to allow a content provider to ensure their content will be played when the device is at a specified location.

In either instance, once the user has chosen a participating display, the method can proceed to step 610 where the user can register to use the system. The registration process can be facilitated through use of the above noted interface devices that can communicate via a mobile application or through the system website, for example. The registration process can allow the user to provide information such as their name, contact information, copyright release/guarantee regarding uploaded content and payment methods, among other information, for example.

Next, the method can proceed to step 615 where the user can be provided with pricing information for the selected display. The pricing information can be based on any number of factors such as the popularity of the display, the time of day the content is to be displayed, the length of the content, etc.

Next, the user can agree to the price and upload their content to the platform provider at step 620. The uploaded content can be stored within the platform provider database 156 and the content can be screened at step 625. As described herein, the screening process can be performed via software or via a human being who views/listens to the content and ensures it does not violate any copyrights or any of the display owner restrictions outlined above at 620.

If the content is approved, the platform provider can charge the user the agreed fee at step 625 and push the content to the content delivery device 20 associated with the selected display at step 630.

At step 635, the platform provider will contact the user to confirm the exact time and location at which the content will be played. For example, if the user has chosen to reserve a time in the future to play the content, the platform provider will notify the user when the content is about to be played. Of course, the user may also request an immediate performance, which will instruct the platform provider to play the content immediately or as soon as possible based on the technical performance of the system components.

At step 640, the content formatter 25 of the content delivery device 20 can format the received content so as to be suitable for the selected display, and the formatted content can be outputted to the display via the output jack 26.

Finally, when the content has been played, the method can proceed to step 645 where the platform provider can send a final message to the user confirming the content was played and details pertaining to the exact time and location of the same.

Accordingly, the above-described system and method function to allow a content provider to push user-specified content onto any number of different display devices at a day and time of their choosing.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A display system, comprising:
   a content delivery device having a main body and an output jack;
   at least one display device that is in communication with the content delivery device; and
   a platform provider interface device that is configured to communicate with the content delivery device, a display owner interface device and a content provider interface device;
   wherein the display owner interface device provides information about the at least one display device to the platform provider,
   wherein the content provider interface device provides content to the platform provider to be displayed on at least one display device,
   wherein the content delivery device is configured to override existing content being displayed on the at least one display device from a secondary source upon receipt of the content from the platform provider,
   wherein the platform provider includes functionality for receiving content limitations from the display owner interface device for each of the at least one display device, wherein the content limitations from the display owner are different for each of the at least one display device, and
   wherein the content delivery device includes a content formatting circuit that is configured to alter content received from the platform provider to simultaneously and individually alter aspect ratios, screen sizes, text sizes, boundary boxes, and adjust volumes to a format that is optimized for the at least one display device within the display system.

2. The system of claim 1, wherein the display comprises an outdoor billboard that is configured to display at least one of a still image, a video image or a combination of a video image and an audible sound.

3. The system of claim 1, wherein the display comprises a video monitor that is configured to display at least one of a still image, a video image or a combination of a video image and an audible sound.

4. The system of claim 1, wherein the display comprises a sound system having at least one speaker that is configured to output audible sounds.

5. The system of claim 1, wherein the output jack of the content delivery device includes at least one of a physical communication port that is configured to engage a communication cable that is connected to the at least one display device, or a wireless transceiver that is configured to communicate wirelessly with the at least one display device.

6. The system of claim 1, wherein the platform provider includes functionality for screening the content from the content provider to comply with the content limitations.

7. The system of claim 6, wherein only content that passes the screening is sent to the content delivery device for playback on at least one display device.

8. The system of claim 1, wherein the platform provider includes functionality for displaying a list containing a plurality of display devices to the content provider interface device.

9. The system of claim 1, wherein the list includes pricing for playing content from the content provider interface device on each of the plurality of display devices.

10. The system of claim 1, wherein the platform provider includes functionality for displaying a plurality of display devices to the content provider interface device.

11. A method, comprising:
providing a content delivery device and a platform provider interface device;
providing at least one display device by a display owner;
receiving content limitations from the display owner for the at least one display device;
connecting the content delivery device to the at least one display device;
receiving a request to display content on the at least one display device by a content provider interface device;
receiving content from the content provider interface device at the platform provider interface device;
sending the content from the platform provider interface device to the content delivery device;
overriding, via the content delivery device, existing content being displayed on the at least one display device from a secondary source; and
playing the content from the platform provider by altering content to simultaneously and individually alter aspect ratios, screen sizes, text sizes, boundary boxes, and adjusting volumes to formatting optimized for at least one display.

* * * * *